United States Patent
Yamauchi

(10) Patent No.: US 6,679,610 B2
(45) Date of Patent: Jan. 20, 2004

(54) ELECTRICALLY POWERED RETRACTABLE DOOR MIRROR

(75) Inventor: Kazunari Yamauchi, Fujieda (JP)

(73) Assignee: Murakami Corporation, Shizuoka (JP)

( * ) Notice: Subject to any disclaimer, the term of this patent is extended or adjusted under 35 U.S.C. 154(b) by 206 days.

(21) Appl. No.: 10/031,213

(22) PCT Filed: Aug. 23, 2001

(86) PCT No.: PCT/JP01/07250

§ 371 (c)(1), (2), (4) Date: Jan. 11, 2002

(87) PCT Pub. No.: WO02/18175

PCT Pub. Date: Mar. 7, 2002

(65) Prior Publication Data

US 2002/0105740 A1 Aug. 8, 2002

(30) Foreign Application Priority Data

Aug. 31, 2000 (JP) ........................................ 2000-262582

(51) Int. Cl.⁷ .......................... G02B 5/08; G02B 7/182; B60R 1/06
(52) U.S. Cl. ...................... 359/841; 359/872; 359/877; 248/479
(58) Field of Search .................. 359/841, 872, 359/877, 881; 248/479, 900

(56) References Cited

U.S. PATENT DOCUMENTS

| | | | | |
|---|---|---|---|---|
| 4,786,156 A | * | 11/1988 | Kotani et al. |
| 4,919,526 A | * | 4/1990 | Umekawa et al. |
| 4,981,349 A | * | 1/1991 | Tamiya et al. |
| 5,369,530 A | * | 11/1994 | Yamauchi et al. |
| 5,384,660 A | * | 1/1995 | Oishi |
| 5,432,641 A | * | 7/1995 | Mochizuki |
| 5,594,590 A | * | 1/1997 | Ishiyama |
| 5,684,646 A | * | 11/1997 | Boddy |
| 5,703,732 A | * | 12/1997 | Boddy et al. |
| 5,781,354 A | * | 7/1998 | Sakata |
| 6,022,113 A | * | 2/2000 | Stolpe et al. |
| 6,132,050 A | * | 10/2000 | Sakata et al. |
| 6,322,221 B1 | * | 11/2001 | Van De Loo |

FOREIGN PATENT DOCUMENTS

| | | |
|---|---|---|
| JP | 6-27336 | 4/1994 |
| JP | 8-72613 | 3/1996 |
| JP | 2575930 | 4/1998 |
| JP | 2000-85470 | 3/2000 |

* cited by examiner

Primary Examiner—Ricky D. Shafer
(74) Attorney, Agent, or Firm—Knobbe, Martens, Olson & Bear, LLP

(57) ABSTRACT

An electrically powered retractable door mirror in which a horizontal worm gear can rotate securely and smoothly by making the horizontal worm gear less affected by building differences between a frame body and a motor installation component is provided. On the under surface of an outer plate 50, horizontal worm gear bearings 76, 78 are provided. In the horizontal worm gear bearings 76, 78, a notch 86 is formed. By fitting shank portions 36a, 36b of the horizontal worm gear 36 through the notch 86, by deflecting the horizontal worm gear bearings 76, 78, into a space inside the bearing 84 of the horizontal worm gear bearings 76, 78, the horizontal worm gear 36 is fixed on the horizontal worm gear bearings 76, 78. At the bottom inside the box 28, flexure control portions 80, 82 are provided. While the outer plate 50 being installed on the frame body 14, the flexure control portions 80, 82 controls flexure of the horizontal worm gear bearings 76, 78 by catching the horizontal worm gear bearing 76, 78 from both sides of the horizontal worm gear bearing.

22 Claims, 6 Drawing Sheets

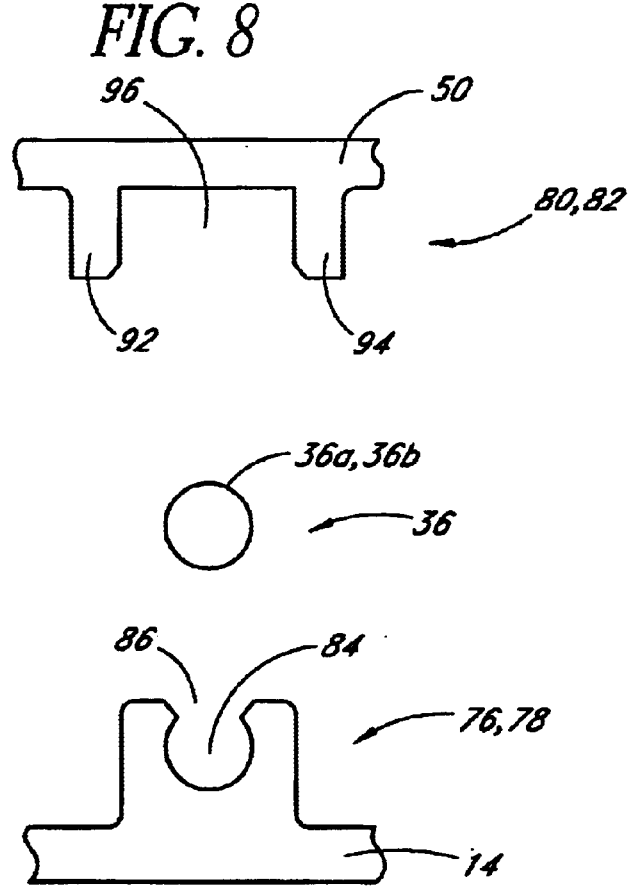
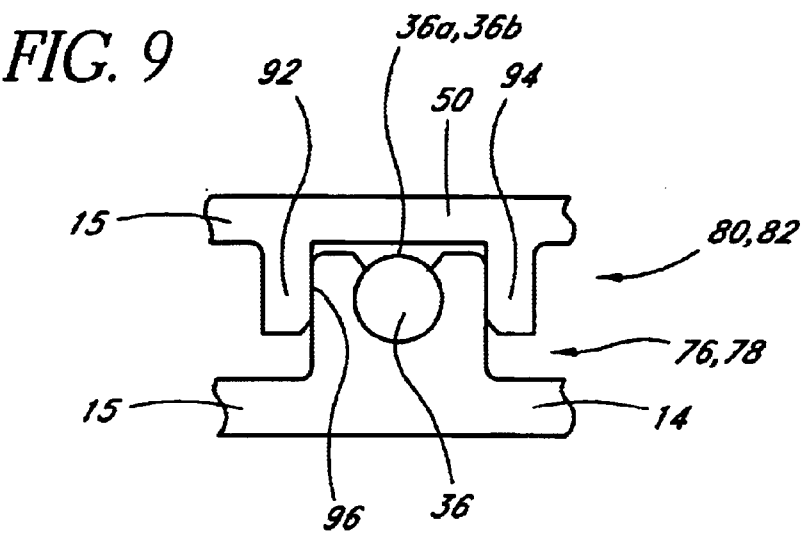

ELECTRICALLY POWERED RETRACTABLE DOOR MIRROR

This application is the U.S. National Phase under 35 U.S.C. §371 of International Application PCT/JP01/07250, filed Aug. 23, 2001, which claims priority to Japanese Patent Application No. 2000-262582, filed Aug. 31, 2000. The International Application was not published under PCT Article 21(2) in English.

TECHNICAL FIELD

The present invention relates to an electrically powered retractable door mirror for a vehicle and provides a secure and smooth support structure for a horizontal worm gear included in a reducer.

BACKGROUND ART

An electrically powered retractable door mirror for a vehicle is designed to be able to position a mirror body supporting a mirror at a returned position (a position in use, an upstanding position) or a stored position alternatively, driven by a motor and operated by remote control.

FIG. 2 is an exploded oblique perspective view of a general structure of an electrically powered retractable door mirror (used on the right-hand side of the vehicle). On the door of the vehicle, a base component (not shown) for installing a door mirror is installed. On a horizontal portion hanging over outside of the vehicle, a shaft 10 is installed and fixed vertically in a standing position. On a lower horizontal portion 10a of the shaft 10, a washer 12 is installed.

On a frame body 14, a mirror body (not shown) is installed. The frame body 14, on the under surface of which a plate stopper 16 is installed, is installed in a way that the frame body can rotate on the shaft 10 freely. When the motor-driven frame body 14 (mirror body) is opening up from the stored position, at the given returned position step portions 16a, 16a of the lower end of the plate stopper 16 contact and engage with trapeziform stoppers 10b, 10b formed at the upper surface of the lower horizontal portion 10a of the shaft 10, and the plate stopper 16 is stopped. By this, the frame body 14 stops in the returned position.

When the frame body 14 is closing down from the returned position driven by a motor, or when the frame body 14 is closing down from its returned position affected by external force applied to the mirror body from the vehicle's front to rear direction, at the given stored position a protruded portion 16b on the inner circumference of the plate stopper 16 contacts and is engaged with one side 10ca of a stopper 10c of the lower portion of the shaft 10. Because of this, the frame body 14 stops at the stored position.

Additionally, if external force is applied to the mirror body from the vehicle's rear to front direction when the frame body 14 is in its returned position, the step portion 16a of the plate stopper 16 gets over trapeziform stoppers 10b, 10b on the lower horizontal portion 10a of the shaft 10. As a result, the frame body 14 collapses toward the vehicle's front side. At this moment, at the given position, the protruded portion 16b on the inner circumference of the plate stopper 16 contacts and is engaged with the other side 10cb of the stopper 10c of the shaft 10. By this, the frame body 14 stops in that position.

Inside a box 28 of the frame body 14, (a gear 18), a plate clutch 20, a coil spring 22 and a washer 24 are housed by letting them through the shaft 10 one by one. In relation to the shaft 10, the gear 18 is supported so as to be rotatable and move axially, and the plate clutch 20 is supported to be able to move axially but not to be rotatable. A plate 26 (fastener) inserted in a groove 10d formed near the upper end of the shaft 10 presses down the washer 24 to compress the coil spring 22, causing the above-mentioned parts 10, 12, (16), 14, 18, 20, 22, 24 and 26 to be integrated.

Inside the box 28, a shaft 30 is installed in a standing position. On the shaft 30, a gear 32, in which upper and lower gears are integrated, and a worm gear wheel 34 are supported so as to be able to rotate freely. Further inside the box 28, a two-step worm gear comprising a horizontal worm gear 36, a worm gear wheel 38 and a vertical worm gear 40 are housed. The horizontal worm gear 36 has a shaft arranged horizontally and supported on both ends by plate ends 42, 44 (metal plates) that are held on wall surfaces facing each other inside the box 28 thus blocking axial movement of the horizontal shaft. The horizontal worm gear 36 engages with the worm gear wheel 34.

On the horizontal worm gear 36, the worm gear wheel 38 is coaxially fixed. The vertical worm gear 40 has a shaft arranged vertically with a ball steel 46 inlet in the lower end of the vertical worm gear 40, and is supported axially by the ball steel 46 on a bush 48 embedded in the bottom inside the box 28. The vertical worm gear 40 engages with the worm gear wheel 38.

The opening end of the upper portion of the box 28 is covered by an outer plate 50 (lid) and the outer plate is fastened with screws 60. The frame body 14 and the outer plate 50 comprise a frame 15. On the upper surface of the outer plate 50, a motor 52 is installed by being fastened with screws 62. A rotating shaft 54 of the motor 52 is let into the box 28 through a hole 56 in the outer plate 50.

Inside the box 28, a washer 58 is let through the rotating shaft 54 of the motor 52; the tip of the rotating shaft 54 is let through a hole at the upper end of the vertical worm gear 40; and the rotating shaft 54 and the vertical worm gear 40 are interlinked. On the side of the casing of the motor 52, a plate circuit sub-assembly 64 is installed on which the control circuit of the motor 52 is loaded. The outer plate 50 is covered by a seal cap 66.

According to the above-mentioned configuration, when the motor 52 is driven, its rotation is transmitted to the vertical worm gear 40, the worm gear wheel 38, the horizontal worm gear 36, the worm gear wheel 34, the gear 32, and to the gear 18. At normal operation (no external force is applied), because the gear 18 engages with the non-rotatable plate clutch 20 at their convexo-concave portions formed on end surfaces facing each other, an axial rotation of the shaft 10 is blocked.

Consequently, the gear 32 goes around the gear 18. By this, the frame body 14 rotates on the shaft 10. When the motor 52 is started from the stored position, the frame body 14 reaches the returned position and step portions 16a, 16a of the plate stopper 16 are engaged with stoppers 10b, 10b of the shaft 10, or when the motor 52 is started from the returned position, the frame body 14 reaches the stored position and the protruded portion 16b of the plate stopper 16 is engaged with one side 10ca of the stopper 10c of the shaft 10, and the motor 52 is locked.

At this time, the control circuit on the plate circuit sub-assembly 64 detects that the motor is locked by detecting a change in driving current of the motor 52 (which is overcurrent) and stops the motor from driving (stop control by the gear lock method).

Additionally, if external force is applied to the mirror body from the vehicle's front to rear direction when the mirror body is in the returned position, resisting to the momentum acquired by the coil spring 22, engagement of the gear 18 and the plate clutch 20 comes off. This enables the gear 18 to axially rotate on the shaft 10. By the external force, the mirror body is closing down in the direction of the stored position, letting off the external force.

Additionally, if external force is applied to the mirror body from the vehicle's rear to front direction when the mirror body is in the returned position, engagement of the step portion 16a, 16a of the plate stopper 16 and the trapeziform stopper 10b, 10b comes off, and at the same time, engagement of the gear 18 and the plate clutch 20 comes off. This enables the gear 18 to axially rotate on the shaft 10. The mirror body collapses toward the vehicle's front side by the external force, letting off the external force.

A conventional support structure of the horizontal worm gear 36 is shown in FIG. 3. At the bottom inside the box 28, protruded portions 68, 70 are formed. At the upper end of the protruded portions 68, 70, concave portions 68a, 70a are formed. On the under surface of the outer plate 50, convex portions 72, 74 are formed in positions facing the concave portions 68a, 70a.

By placing shank portions 36a, 36b located on both sides of the horizontal worm gear 36 into the concave portions 68a, 70a, and installing the outer plate 50 by laying it over the opening end of the upper portion of the box 28 and fastening it with screws 60 (FIG. 2), as shown in FIG. 4, the convex portions 72, 74 are inserted into the concave portions 68a, 70a, and the shank portions 36a, 36b of the horizontal worm gear 36 are fixed between the lower end surfaces 72a, 74a of convex portions 72, 74 and the concave portions 68a, 70a.

According to the support structure of the horizontal worm gear 36 shown in FIG. 3 and FIG. 4, because the horizontal worm gear 36 is supported by the concave portions 68a, 70a on the side of the frame body 14 and the lower end surfaces 72a, 74a of the convex portion 72, 74 on the under side of the outer plate 50, the horizontal worm gear 36 rattles or is compressed due to building differences between the frame body 14 and the outer plate 50 (a motor installation component), occasionally preventing the horizontal worm gear 36 from rotating securely and smoothly.

The present invention intends to solve problems in the above-mentioned conventional technologies, and to provide an electrically powered retractable door mirror in which secure and smooth rotation of the horizontal worm gear can be obtained by making the horizontal worm gear less affected by building differences between the frame body and the motor installation component.

DISCLOSURE OF INVENTION

The present invention describes an electrically powered retractable door mirror which comprises a frame supported on a shaft formed on the vehicle side being able to rotate freely and a mirror body installed on the frame, which has a structure wherein a motor and a reducer are installed on the frame, the driving force of the motor is transmitted to the shaft through the reducer, the frame is axially rotated on the shaft and the mirror body is moved to its returned position or stored position, and in which the frame possesses a frame body and a motor installation component, the motor is installed on the motor installation component and a horizontal worm gear is included in the reducer.

The electrically powered retractable door mirror comprises: on one of the frame body or the motor installation component a horizontal worm gear bearing which supports the shank portion of the horizontal worm gear by encircling the periphery of the shank portion; in the horizontal worm gear bearing, a notch linking up to a space inside the bearing is formed by cutting off a part of the horizontal worm gear bearing in its peripheral direction; the width of the notch is formed narrower than the diameter of the shank portion of the horizontal worm gear. By inserting the shank portion of the horizontal worm gear in the space inside the horizontal worm gear bearing through the notch by deflecting the horizontal worm gear bearing in a direction that opens up the notch, the horizontal worm gear is supported on the horizontal worm gear bearing. And on the other one of the frame body or the motor installation component, flexure control portions are provided, which control flexure of the horizontal worm gear bearing in the direction that the notch opens up by bringing the motor installation component installed on the frame body into contact with the horizontal worm gear bearing.

According to the present invention, because the horizontal worm gear is supported on the horizontal worm gear bearing by inserting the shank portion of the horizontal worm gear into the space inside the horizontal worm gear bearing through the notch by deflecting the horizontal worm gear bearing in the direction that the notch opens up, the horizontal worm gear is able to be supported on one of the frame body or the motor installation component, and the supporting position of the horizontal worm gear is less affected by building differences between the frame body and the motor installation component.

Furthermore, in the configuration in which the frame body and the motor installation component are built, the flexure control portions provided on the other of the frame body or the motor installation component contact the horizontal worm gear bearing, controlling flexure of the horizontal worm gear bearing (i.e., the notch opens up) by gear reaction force while the horizontal worm gear is in operation. By this, the horizontal worm gear is able to rotate securely and smoothly.

In the present invention, for example, the horizontal worm gear bearing and the flexure control portion are arranged opposite one another with the motor installation component and the frame body facing each other. By arranging the motor installation component opposite to the installation position of the frame body, a structure, in which the flexure control portion controls the flexure in a direction that the notch of the horizontal worm gear bearing opens up by contacting the horizontal worm gear bearing, is provided.

The notch is formed on the side of the horizontal worm gear bearing, which faces the other of the frame body or the motor installation component. Holding the horizontal worm gear between both sides of the horizontal worm gear bearing, the flexure control portion is able to control the flexure in the direction that the notch opens up.

Additionally, for the horizontal worm gear bearing, a material with sliding property and abrasion resistance higher than a material used for the flexure control portion can be used. For the flexure control portion, a material with rigidity higher than a material used for the horizontal worm gear bearing can be used. Conventionally, to sustain gear reaction force, rigid resins such as those containing glass fiber had to be used for horizontal worm gear bearings. Due to this, it was difficult for the flexure control portion to have both sliding property and abrasion resistance. By using different materials for the horizontal worm gear bearing and the flexure control portion, necessary rigidity, sliding property and abrasion resistance can be successfully combined.

Additionally, the horizontal worm gear bearing can be formed using a synthetic resin in a way that it is integrated with one of the frame body or the motor installation component, and the flexure control portion can be formed using a synthetic resin in a way that it is integrated with the other of the frame body or the motor installation component.

Additionally, the shape of a cross section meeting at right angles with the shaft of the space inside the horizontal worm gear bearing can be formed in a circle and the notch can be formed within the range below 180 degrees of the circumference of the circle.

Additionally, the motor installation component comprises a lid for the box housing the shaft and the reducer. The motor is installed outside of the lid, and it can be structured such that the rotating shaft of the motor passes through the lid and is inserted inside the box.

BRIEF DESCRIPTION OF DRAWINGS

FIG. 8 is a view of Embodiment 2 according to the present invention and is an exploded view of a structure of the horizontal worm gear bearings 76, 78 and the flexure control portions 80, 82, seen from the axial direction of the horizontal worm gear. 36.

FIG. 9 is a view of a structure, in which the outer plate 50 is built on the frame body shown in FIG. 8, seen from the axial direction of the horizontal worm gear 36.

BEST MODES FOR CARRYING OUT THE INVENTION

Figure 1:
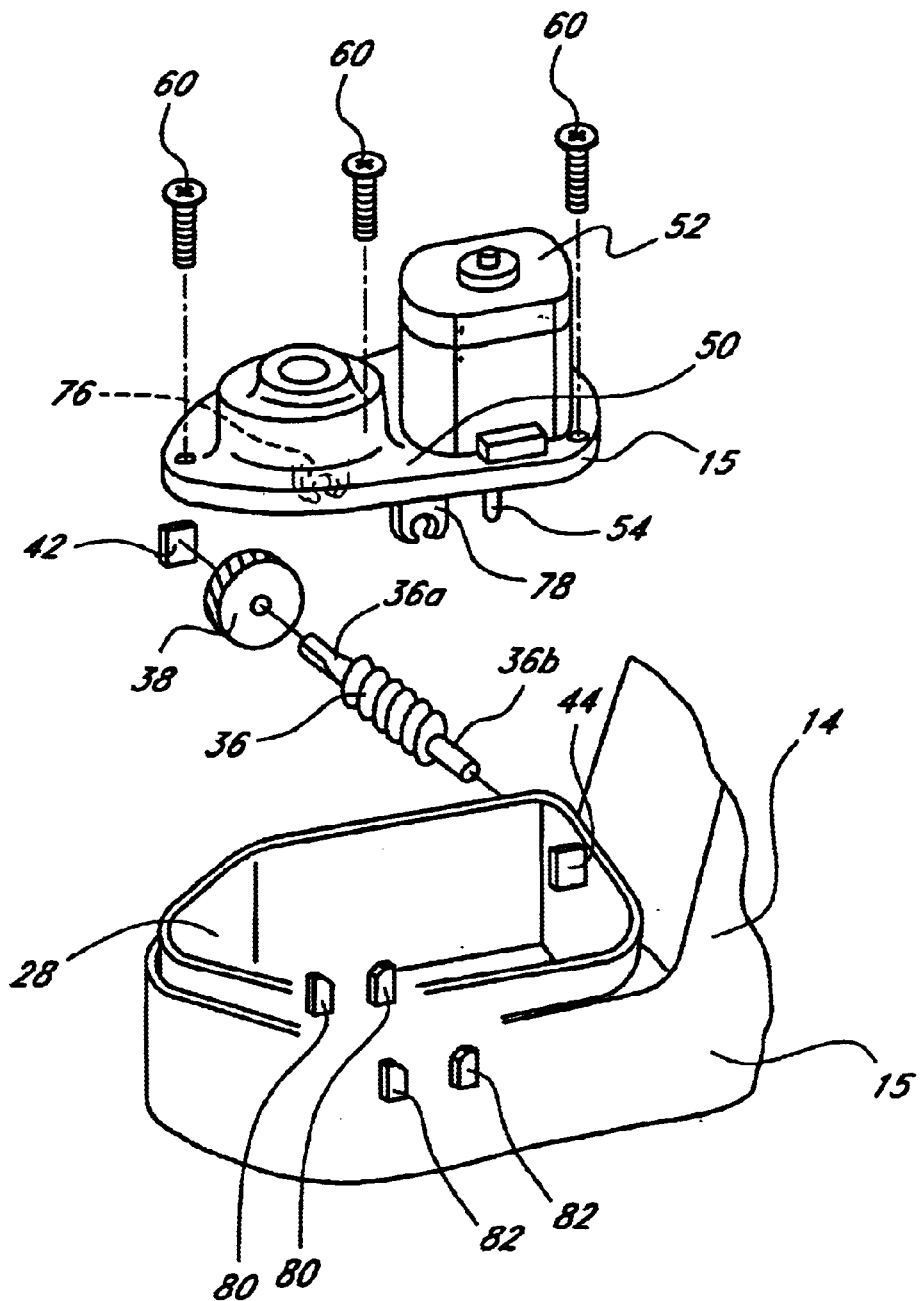
FIG. 1 is an exploded oblique perspective view of Embodiment 1 according to the present invention.

To describe the present invention in detail, the best modes 1 and 2 for carrying out the invention are explained referring to the drawings attached.

[Embodiment 1]

Figure 2:
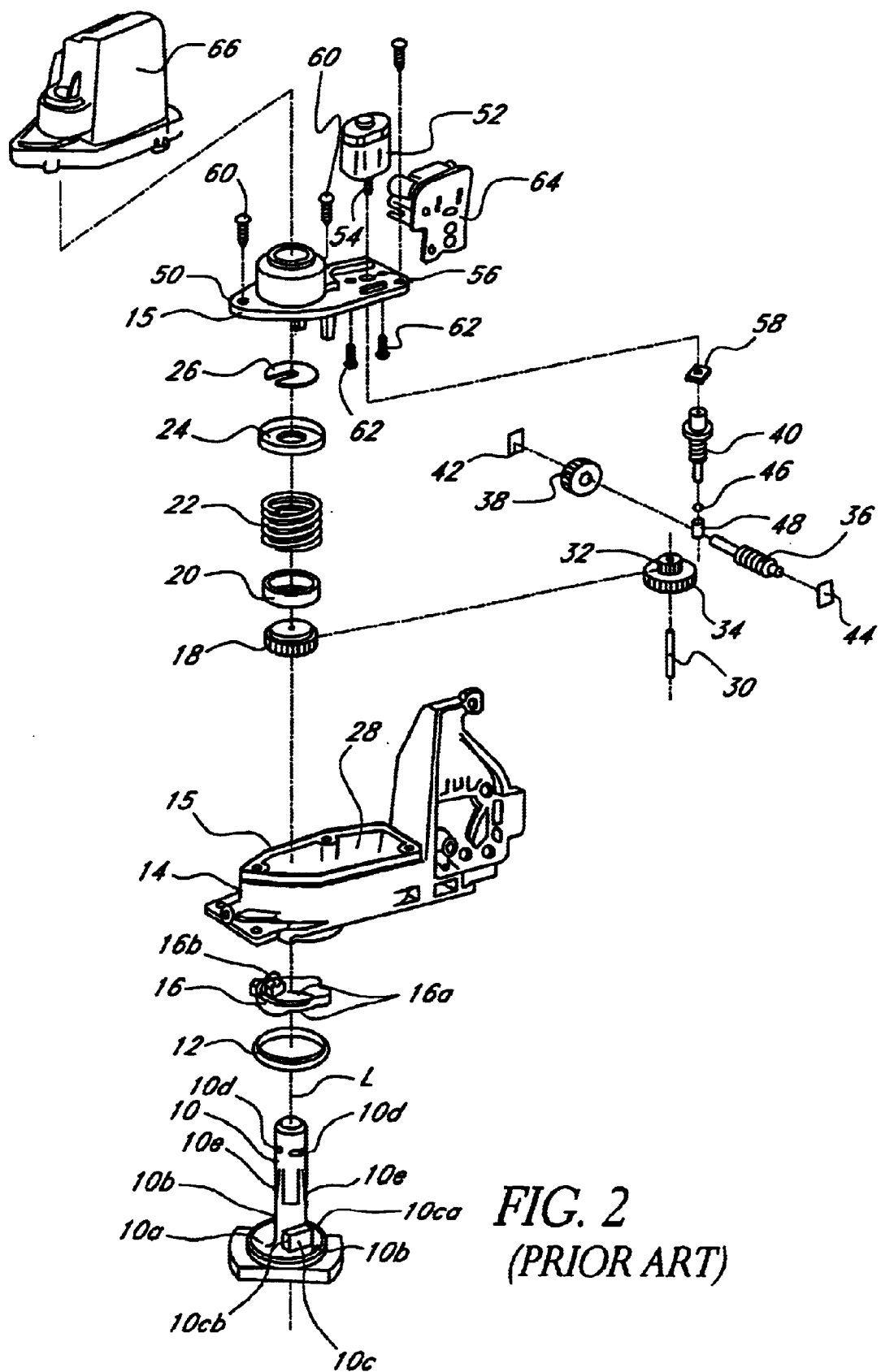
FIG. 2 is an exploded oblique perspective view of an overall structure of an electrically powered retractable door mirror.
Figure 3:
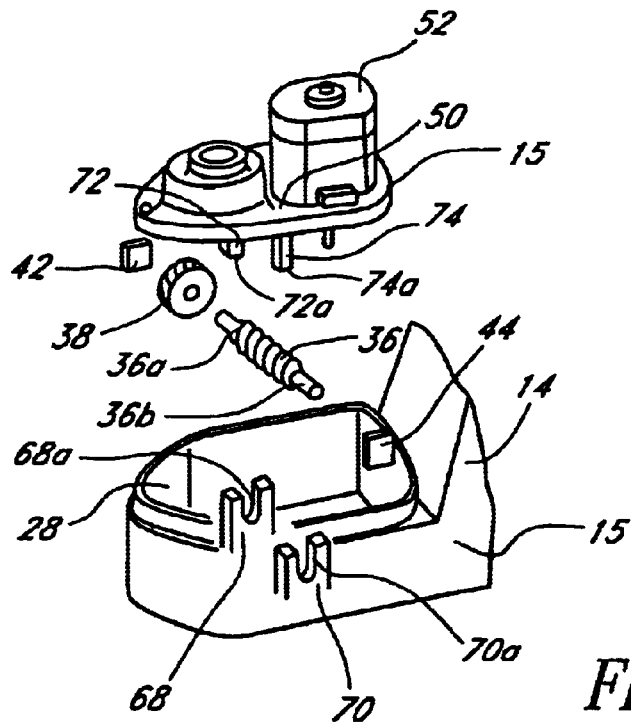
FIG. 3 is an exploded oblique perspective view of a conventional support structure for a horizontal worm gear.
Figure 4:
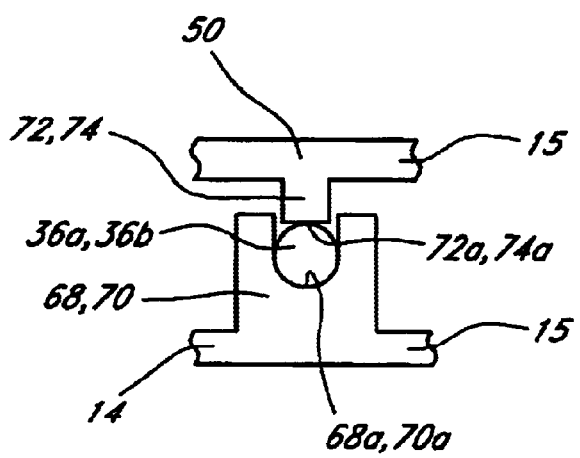
FIG. 4 is a view of a structure, in which an outer plate 50 is built on the frame body 14 shown in FIG. 3, seen from the axial direction of the horizontal worm gear.

Embodiment 1 in which the present invention is applied to an electrically powered retractable door mirror is shown in FIG. 1. The same symbols are used for the portions common to FIG. 2. Additionally, FIG. 1 shows only the main portions, and portions not shown should be configured in the same way as in FIG. 2. A frame body 14 and an outer plate 50 comprise a frame 15.

Inside a box 28 of the frame body 14, a reducer including a horizontal worm gear 36 and others is housed. The horizontal worm gear 36 is arranged with its axis horizontally. Both ends of the horizontal worm gear 36 are supported axially by plate ends 42, 44 (metal plates) held on wall surfaces facing each other inside the box 28 that block axial movement of the horizontal shaft. On the horizontal worm gear 36, a worm gear wheel 38 is fixed on the same axis.

The opening end of the upper portion of the box 28 is covered by the outer plate 50 (a lid), and the outer plate is fastened with screws 60. A motor 52 is fixed with screws on the top of the outer plate 50. A rotating shaft 54 of the motor 52 is let into the box 28 from a hole in the outer plate 50. Inside the box 28, a vertical worm gear 40 (FIG. 2) is attached to the rotating shaft of the motor 52.

On the under surface of the outer plate 50, horizontal worm gear bearings 76, 78 made of a synthetic resin (POM (polyacetal), etc.) with high sliding property, abrasion resistance and flexibility, are formed monolithically with the outer plate 50 (or separately). At the bottom inside the box 28, and in a position opposite to horizontal worm gear bearings 76, 78, flexure control portions 80, 82 made of a synthetic resin (reinforced resins such as glass fiber reinforced resin, etc.) with high rigidity are formed monolithically with the box 28 (frame body 14) (or separately).

Figure 5:
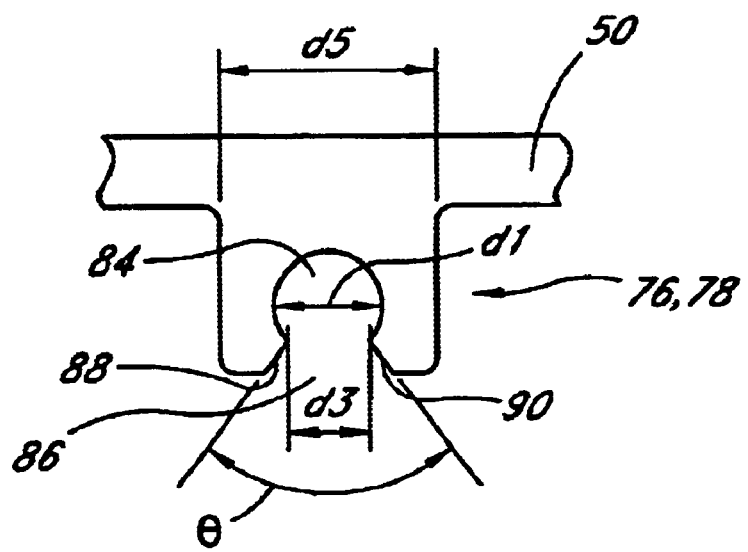
FIG. 5 is an exploded view of a structure of horizontal worm gear bearings 76, 78 and flexure control portions 80, 82 shown in FIG. 1, seen from the axial direction of the horizontal worm gear 36.
Figure 5:
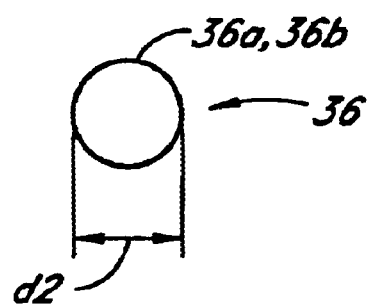
Figure 5:
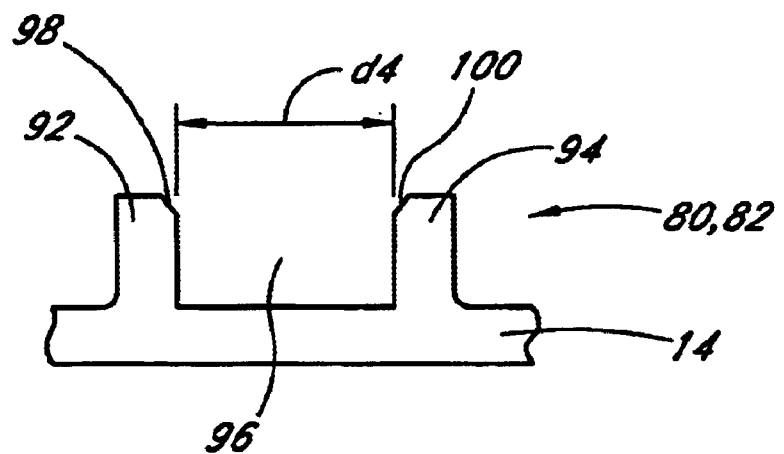

An exploded view of a structure of the horizontal worm gear bearings 76, 78 and flexure control portions 80, 82, seen from the axial direction of the horizontal worm gear 36 is shown in FIG. 5. In the horizontal worm gear bearings 76, 78, a space 84 inside the bearing, which accommodates shank portions 36a, 36b of the horizontal worm gear 36 rotatably, is formed. A bore diameter d1 of the horizontal worm gear bearing is formed as nearly the same as (slightly larger than) an external diameter d2 of the shank portions 36a, 36b so as to hold the shank portions 36a, 36b of the horizontal worm gear 36 without rattling and putting pressure on the shank portions.

In the lower portion of the horizontal worm gear bearings 76, 78 (on the side facing the frame body 14), a notch 86 is formed. The angle range θ of the notch 86 is set with respect to a vertical downward line used as the center of the angle range and within the range narrower than 180 degrees of the inner circumference of the space inside the bearing 84. Due to this, a width d3 of the notch 86 is formed narrower than the external diameter d2 of the shank portions 36a, 36b of the horizontal worm gear 36. In the opening end of the notch 86, tapered surfaces 88, 90 are formed so that the shank portions 36a, 36b of the horizontal worm gear can be easily pushed into the space inside the bearing through the notch 86.

The flexure control portions 80, 82 comprise two convex portions 92, 94. An inner width d4 between the convex portions 92, 94 is formed nearly equivalent to an outer width d5 of the horizontal worm gear bearings 76, 78. In the opening end of a space 96 tucked between the convex portions 92, 94, tapered surfaces 98, 100 are formed so that the horizontal worm gear bearings 76, 78 can be easily inserted in the space 96.

Figure 6:
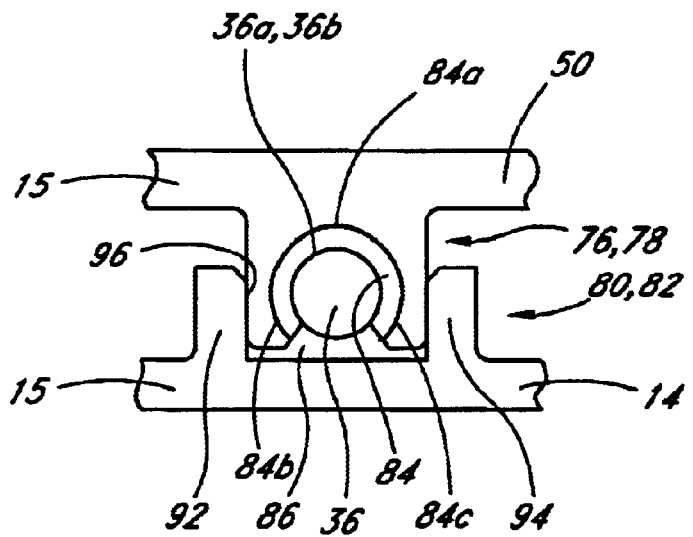
FIG. 6 is a view of a structure, in which the outer plate 50 is built on the frame body 14 shown in FIG. 1, seen from the axial direction of the horizontal worm gear 36.
Figure 7:
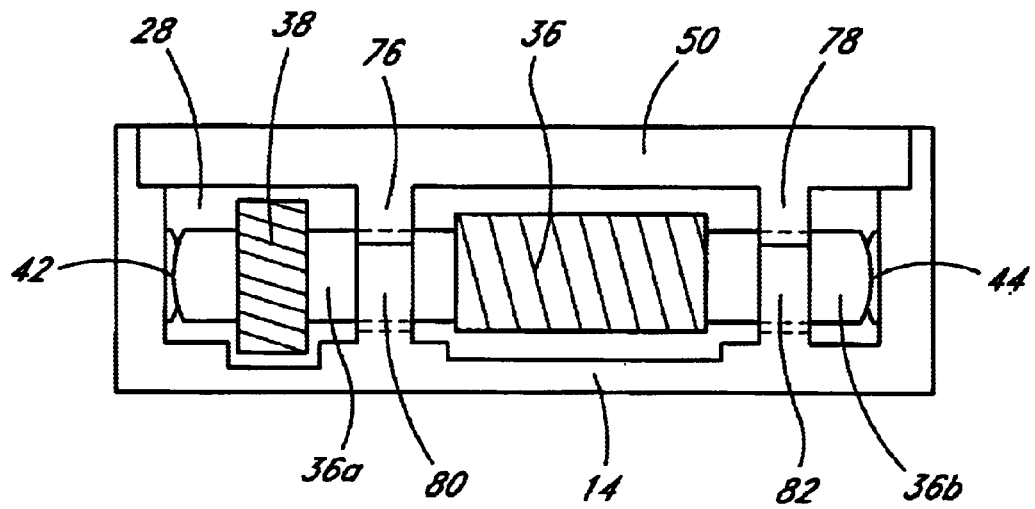
FIG. 7 is a view of a structure, in which the outer plate 50 is built on the frame body 14 shown in FIG. 1, seen from the horizontal direction meeting at right angles with the axis of the horizontal worm gear 35.

A structure in which the outer plate 50 is built on the frame body 14 is shown in FIG. 6 seen from the axial direction of the horizontal worm gear 36, and in FIG. 7 seen from the horizontal direction meeting at right angles with the shaft of the horizontal worm gear 36. By pushing the shank portions 36a, 36b of the horizontal worm gear 36 through the notch 86, and the horizontal worm gear bearings 76, 78 by deflecting them elastically in the direction so that the notch 86 opens up, into the space inside the bearing 84 of the horizontal worm gear bearings 76, 78, the horizontal worm gear 36 is installed to be rotatable on the horizontal worm gear bearings 76, 78.

Because in the inner circumference of the space 84 inside the bearing, overlapping portions 84b, 84c are formed continuously from an upper-half 180-degree portion 84a, the horizontal worm gear 36 can be held solely by the horizontal worm gear bearings 76, 78 without letting it fall out. In this position, the outer plate 50 is placed facing the given position in the frame body (the opening end of the box 28) from above. By this, the horizontal worm gear bearings 76, 78 are inserted in the space 96 of the flexure control portions 80, 82, and are held between the convex portions 92, 94.

By this, flexure of the horizontal worm gear bearings 76, 78 is controlled by the flexure control portions 80, 82, flexure of the horizontal worm gear 36 by gear reaction force when in operation is prevented, and secure and smooth rotation of the horizontal worm gear 36 is achieved.

The outer plate 50 is fixed with screws on the frame body 14. According to this embodiment, the vertical worm gear 40, the worm gear wheel 38 and the horizontal worm gear 36 are together set up on the underside of the outer plate 50. Because of this, gears 40, 38, 36 engage without being affected by building differences between the frame body 14 and the outer plate 50.

[Embodiment 2]

In Embodiment 1, the horizontal worm gear bearings 76, 78 are formed on the side of the outer plate 50, and the flexure control portions 80, 82 are formed on the side of the frame body 14. This arrangement can be reversed. An embodiment using a reverse arrangement is shown in FIG. 8 in an exploded view seen from the axial direction of the horizontal worm gear 36. A structure in which the horizontal worm gear bearings and the outer plate are built is shown in FIG. 9 in a position seen from the axial direction of the horizontal worm gear 36.

FIG. 8 and FIG. 9 show only the main portions, and portions not shown should be configured in the same way as in Embodiment 1. The same symbols are used for the portions common to Embodiment 1. The frame body 14 and the outer plate 50 comprise the frame 15. At the bottom of the box 28, the horizontal worm gear bearings 76, 78 are formed monolithically with the outer plate 50 (or separately), which are made of a synthetic resin (POM (polyacetal), etc.) with high sliding property, abrasion resistance and flexibility.

On the under surface of the outer plate 50, in positions opposite to horizontal worm gear bearings 76, 78, flexure control portions 80, 82 made of a synthetic resin (reinforced resins such as glass fiber reinforced resin, etc.) with high rigidity are formed monolithically with the box 28 (frame body 14) (or separately). The shape, structure and dimension of the horizontal worm gear bearings 76, 78, the flexure control portions 80, 82 and the shank portions 36a, 36b of the horizontal worm gear 36 are the same as described for FIG. 5. By pushing the shank portions 36a, 36b of the horizontal worm gear 36 through the notch 86, by deflecting the horizontal worm gear bearings 76, 78 in the direction so that the notch 86 opens up, into a space inside the bearing 84 of the horizontal worm gear bearings 76, 78, the horizontal worm gear 36 is supported on the horizontal worm gear bearings 76, 78 to be rotatable. In this position, the outer plate 50 is placed facing the given position of the frame body (the opening end of the box 28) from above. By this, the horizontal worm gear bearings 76, 78 are inserted in the space 96 of the flexure control portions 80, 82, and are wedged between the convex portions 92, 94. By this, flexure of the horizontal worm gear bearings 76, 78 is controlled by the flexure control portions 80, 82, and the horizontal worm gear 36 is able to rotate securely and smoothly. The outer plate 50 is fixed with screws in the frame body 14.

Industrial Applicability

As described above, the present invention has solved problems presented in conventional technologies and has achieved that the horizontal worm gear is less affected by building differences between the frame body and the motor installation component. Thus, the present invention is extremely serviceable as a support structure enabling secure and smooth operation of a horizontal worm gear, which is included in a reducer in an electrically powered retractable door mirror.

What is claimed is:

1. An electrically powered retractable door mirror which comprises a frame rotatably supported on a shaft formed on a vehicle side and a mirror body installed on the frame, said mirror having a mechanism in which a motor and a reducer are installed on the frame, the driving force of the motor is transmitted to said shaft through the reducer, said frame is rotated on said shaft, and said mirror body is moved to a returned position or a stored position;

wherein said frame possesses a frame body and a motor installation component installed on the frame body, said motor is installed on the motor installation component, and said reducer includes a horizontal worm gear, wherein on one of said frame body or said motor installation component, a horizontal worm gear bearing supports a shank a portion of the horizontal worm gear by encircling the periphery of the shank portion of said horizontal worm gear is provided;

in the horizontal worm gear bearing, a notch linking up to a space inside the bearing is formed by cutting off a part of the horizontal worm gear bearing in its peripheral direction;

the width of the notch is formed narrower than the diameter of said shank of the horizontal worm gear;

by inserting the shank portion of the horizontal worm gear in the space inside the horizontal worm gear bearing through the notch by deflecting the horizontal worm gear bearing in a direction that the notch opens up, the horizontal worm gear is supported on the horizontal worm gear bearing;

on the other of said frame body or said motor installation component, while the motor installation component being installed on the frame body and by bringing the motor installation component into contact with said horizontal worm gear bearing, flexure control portions which control flexure of the horizontal worm gear bearing in the direction that the notch opens up are provided.

2. The electrically powered retractable door mirror as claimed in claim 1, wherein said horizontal worm gear bearing and said flexure control portions are arranged opposite another with said motor installation component and said frame body, facing each other; by arranging said motor installation component opposite to the installation position of said frame body, said flexure control portions are configured to be able to control flexure in a direction that said notch of the horizontal worm gear bearing opens up by contacting said horizontal worm gear bearing.

3. The electrically powered retractable door mirror as claimed in claim 2, wherein said notch is formed on the side of said horizontal worm gear bearing, which faces the other of said frame body or said motor installation component, and said flexure control portions catch said horizontal worm gear bearing from both sides of the horizontal worm gear bearing to control flexure in the direction that said notch opens up.

4. The electrically powered retractable door mirror as claimed in claim 2, wherein said horizontal worm gear bearing is made of a material with sliding property and abrasion resistance higher than a material used for said flexure control portions, and said flexure control portions are made of the material with rigidity higher than the material used for said horizontal worm gear bearing.

5. The electrically powered retractable door mirror as claimed in claim 2, wherein said horizontal worm gear bearing is formed monolithically with one of said frame body or said motor installation component using a synthetic resin, and said flexure control portions are formed monolithically with the other of said frame body or said motor installation component using a synthetic resin.

6. The electrically powered retractable door mirror as claimed in claim 2, wherein a shape of a cross section meeting at right angles with the shaft of a space inside said horizontal worm gear bearing is formed in a circle, and said notch is formed within a range below 180 degrees of the circumference of the circle.

7. The electrically powered retractable door mirror as claimed in claim 2, wherein said motor installation componet comprises a lid for a box housing said shaft and said reducer, said motor is installed outside of the lid, and rotating shaft of the motor passes through the lid and is inserted inside said box.

8. The electrically powered retractable door mirror as claimed in claim 1, wherein said notch is formed on the side of said horizontal worm gear bearing, which faces the other of said frame body or said motor installation component, and said flexure control portions catch said horizontal worm gear bearing from both sides of the horizontal worm gear bearing to control flexure in the direction that said notch opens up.

9. The electrically powered retractable door mirror as claimed in claim 8 wherein said horizontal worm gear bearing is made of a material with sliding property and abrasion resistance higher than a material used for said flexure control portions, and said flexure control portions are made of the material with rigidity higher than the material used for said horizontal worm gear bearing.

10. The electrically powered retractable door mirror as claimed in claim 8 wherein said horizontal worm gear bearing is formed monolithically with one of said frame body or said motor installation component using a synthetic resin, and said flexure control portions are formed monolithically with the other of said frame body or said motor installation component using a synthetic resin.

11. The electrically powered retractable door mirror as claimed in claim 8 wherein a shape of a cross section meeting at right angles with the shaft of a space inside said horizontal worm gear bearing is formed in a circle, and said notch is formed within a range below 180 degrees of the circumference of the circle.

12. The electrically powered retractable door mirror as claimed in claim 8 wherein said motor installation component comprises a lid for a box housing said shaft and said reducer, said motor is installed outside of the lid, and the rotating shaft of the motor passes through the lid and is inserted inside said box.

13. The electrically powered retractable door mirror as claimed in claim 1, wherein said horizontal worm gear bearing is made of a material with sliding property and abrasion resistance higher than a material used for said flexure control portions, and said flexure control portions are made of the material with ridigity higher than the material used for said horizontial worm gear bearing.

14. The electrically powered retractable door mirror as claimed in claim 13, wherein said horizontal worm gear bearing is formed monolithically with one said frame body or said motor installation component using a synthetic resin, and flexure control portions are formed monolithically with the other of said frame body or said motor installation component using a synthetic resin.

15. The electrically powered retractable door mirror as claimed in claim 13, wherein a shape of a cross section meeting at right with the shaft of a space inside said horizontal worm gear bearing is formed in a circle, and said is formed within a range below 180 degrees of the circumference of the circle.

16. The electrically powered retractable door mirror as claimed in claim 13, wherein said motor installation component comprises a lid for a box housing said shaft and said reducer, said motor is installed outside of the lid, and the rotating shaft of the motor passes through the lid and is inserted inside said box.

17. The electrically powered retractable door mirror as claimed in claim 1, wherein said horizontal worm gear bearing is formed monolithically with one said frame body or said motor installation component using a synthetic resin, and said flexure control portions are formed monolithically with the other of said frame body or said installation component using a synthetic resin.

18. The electrically powered retractable door mirror as claimed in claim 17 wherein a shape of a cross section meeting at right angles with the shaft of a space inside said horizontal worm gear bearing is formed in a circle, and said notch is formed within a range below 180 degrees of the circumference of the circle.

19. The electrically powered retractable door mirror as claimed in claim 17 wherein said motor installation component comprises a lid for a box housing said shaft and said reducer, said motor is installed outside of the lid, and the rotating shaft of the motor passes through the lid and is inserted inside said box.

20. The electrically powered retractable door mirror as claimed in claim 1, wherein a shape of a cross section meeting at right angles with the shaft of a space inside said horizontal worm gear bearing is formed in a circle, and said notch is formed within a range below 180 degrees of the circumference of the circle.

21. The electrically powered retractable door mirror as claimed in claim 20 wherein said motor installation component comprises a lid for a box housing said shaft and said reducer, said motor is installed outside of the lid, and the rotating shaft of the motor passes through the lid and is inserted inside said box.

22. The electrically powered retractable door mirror as claimed in claim 1, wherein said motor installation component comprises a lid for a box housing said shaft and said reducer, said notor is installed outside of the lid, and the rotating shaft of the motor passes through the lid and is inserted inside said box.

* * * * *